J. H. HARPER.
Hubs for Carriage Wheels.
No. 5,182. Reissued Dec. 10, 1872.
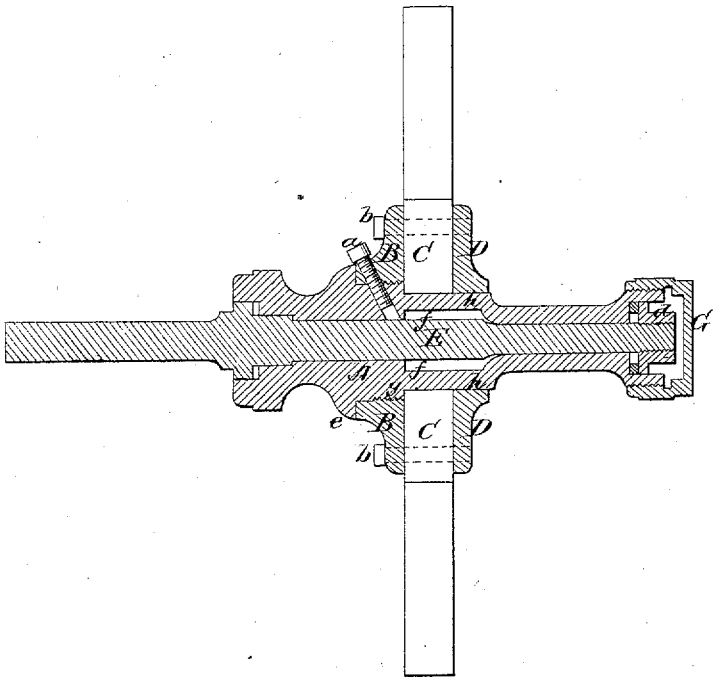
Witnesses.
C. F. Brown
Dr. H. Ellsworth
Inventor:
J. H. Harper
by his Attorneys
Hill & Ellsworth
AM PHOTO-LITHOGRAPHIC CO. N.Y. (OSBORNE'S PROCESS.)

UNITED STATES PATENT OFFICE.

JOHN H. HARPER, OF PITTSBURG, PENNSYLVANIA.

IMPROVEMENT IN HUBS FOR CARRIAGE-WHEELS.

Specification forming part of Letters Patent No. 112,452, dated March 7, 1871; reissue No. 5,182, dated December 10, 1872.

*To all whom it may concern:*

Be it known that I, JOHN H. HARPER, of Pittsburg, in the county of Allegheny and State of Pennsylvania, have invented a new and Improved Metallic Hub for Carriage-Wheels; and I do hereby declare the following to be a full, clear, and exact description of the same, reference being had to the accompanying drawing forming part of this specification, in which—

The figure is a longitudinal vertical section of the hub applied to the axle of a carriage.

My invention relates to that class of metallic hubs for carriage and wagon wheels in which the spokes are held between flanges applied to the pipe-box or to a hub containing the latter.

These hubs, as usually constructed, contain about the same quantity of metal in front and rear of the spokes so disposed as to render the hub of uniform strength throughout its entire length, or strongest outside the spokes, where the increased strength is least required, for the reason that the inner ends are subjected to the greatest strain, while the outer ends serve principally as bearings for the axle. The result of this construction is that the hub may break between the spokes and its inner end.

My invention has for its object to overcome these difficulties and provide for general use a strong, durable wheel without increasing the cost of manufacture, but, on the contrary, reducing this cost materially. To this end the invention consists, first, in constructing the hub of a pipe-box and two removable flanges, the box screwing into the inner flange only, and the outer flange and spokes being held thereto and upon the box by bolts or rivets. This construction requires that the inner flange be made the stronger, because it sustains the principal part of the strain, while it admits of the outer flange, as well as the outer end of the box, being made much lighter. The whole hub is stronger at its inner end, where the additional strength is required, and is, therefore, not liable to be broken by any unusual strain. The flanges and spokes form one distinct part of the hub, and are together fitted upon or removed from the box. The invention consists, secondly, in the combination of an oil-channel and adjusting-screw with the pipe-box and inner flange, as I will now proceed to describe.

In the accompanying drawing, A is the box, constructed with a shoulder, *e*, at a point between the middle and inner end; and B is the inner flange, constructed with an internal screw-thread to screw upon the threaded portion *g* of the box, so as to fit snugly against the shoulder *e*. D is the outer flange, fitted upon the plain surface *h* of the box; and C C are the spokes, secured firmly between the two flanges by means of bolts or rivets *b b*, which pass through the flanges between the spokes, each bolt being halved into two adjoining spokes. The inner flange, together with the shoulder *e* and threaded portion *g* of the box, strengthens the hub in rear of the spokes, and tends to prevent it from being broken, and at the same time produces a firm and secure means for holding the spokes in the proper position.

By this construction the outer flange, as well as the outer end of the box, may be made very light without impairing materially the strength of the hub. Its cost of manufacture is, therefore, considerably reduced.

One of the principal difficulties encountered in the metallic hubs, as usually constructed, consists in the cutting or wearing out of the box; and, inasmuch as this cannot be renewed, the whole wheel is rendered useless.

In my invention, however, the spokes and flanges are firmly secured together, so that if the box is cut out it can be removed and another inserted in its place without injuring the wheel in the least or disturbing the position of the spokes and flanges with respect to each other. Instead, therefore, of destroying the entire wheel, the box only is changed at trifling expense.

The wheel is held upon the spindle E by a nut, *d*, which is inclosed within a recess at the outer end of the box, the latter being covered by a screw-cap, G, as shown. *a* is a set-screw inserted in an inclined opening through the inner flange and box A, and *f* is an oil-chamber formed within the box directly under the spokes and outer flange, as shown. By this arrangement the spindle may be lubricated without removing the wheel, the cap G preventing the escape of grease around the spindle. The screw *a* also serves to hold, when running, the flange B from turning upon the box, although each set of boxes and flanges is made with right-and-left screw-threads, so that they shall tighten when the wheels are running.

Having thus described my invention, what I claim is—

1. A metallic hub for carriage and wagon wheels, formed of the two flanges B D and the box A, made separate from each other, when the box is screwed into the inner flange only, substantially as described, for the purposes specified.

2. The combination of the set-screw *a*, oil-chamber *f* having an inclined passage, and inner flange B, when said flange is screwed on the box A, substantially as described.

3. In combination with the spindle E, the box A with oil-chamber *f*, the screw-flange B with oil-passage and screw *a*, the spokes C C, flange D, and bolts *b b*, all substantially as and for the purposes herein set forth.

J. H. HARPER.

Witnesses:
N. K. ELLSWORTH,
M. CHURCH.